(12) United States Patent
Yeon et al.

(10) Patent No.: US 9,761,379 B2
(45) Date of Patent: Sep. 12, 2017

(54) STACK-TYPE FLOW ENERGY STORAGE SYSTEM AND METHOD OF CHARGING AND DISCHARGING ENERGY USING THE SAME

(71) Applicant: Korea Institute of Energy Research, Daejeon (KR)

(72) Inventors: Sun-Hwa Yeon, Daejeon (KR); Kyoung-Hee Shin, Daejeon (KR); Jae-Deok Jeon, Daejeon (KR); Se-Kook Park, Daejeon (KR); Dae Wi Kim, Daejeon (KR); Jung Joon Yoo, Daejeon (KR); Hana Yoon, Daejeon (KR); Sun-Dong Kim, Daejeon (KR); Hyunuk Kim, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 272 days.

(21) Appl. No.: 14/335,035

(22) Filed: Jul. 18, 2014

(65) Prior Publication Data
US 2015/0179355 A1    Jun. 25, 2015

(30) Foreign Application Priority Data

Dec. 19, 2013 (KR) .......................... 10-2013-0159303

(51) Int. Cl.
*H01G 11/28* (2013.01)
*H02J 7/00* (2006.01)
(Continued)

(52) U.S. Cl.
CPC ............. *H01G 11/28* (2013.01); *H01G 11/12* (2013.01); *H01G 11/62* (2013.01); *H01G 11/68* (2013.01);
(Continued)

(58) Field of Classification Search
CPC ........ H01G 11/28; H01G 11/68; H01G 11/52; H01G 11/32; H02J 7/00; H02J 7/0052
(Continued)

(56) References Cited

U.S. PATENT DOCUMENTS

| 2005/0211136 A1* | 9/2005 | Drummond ............ H01G 9/038 106/311 |
| 2012/0024697 A1* | 2/2012 | Antheunis ............ B01D 67/009 204/252 |

(Continued)

FOREIGN PATENT DOCUMENTS

| JP | 2003036849 A | 2/2003 |
| JP | 2009224141 A | 10/2009 |

(Continued)

OTHER PUBLICATIONS

Office Action issued for corresponding Korean Patent Application No. 10-2013-015303, dated Nov. 24, 2014.
(Continued)

*Primary Examiner* — Eric Thomas
*Assistant Examiner* — Michael P McFadden
(74) *Attorney, Agent, or Firm* — Westman, Champlin & Koehler, P.A.; Amanda M. Prose

(57) ABSTRACT

Disclosed herein is stack-type flow energy storage system. More particularly, the system includes a stack-type electrode cell composed of fluidic electrode material mixed with an electrolyte and storage tank for the electrode material, thereby remarkably improving stability, output and energy density. The stack-type flow energy storage system is advantageous in that unit cells, each consisting of a cathode, a separation membrane and an anode, are connected in parallel or in series to each other to make a stack cell, thus remarkably increasing output power. Further, the stack-type flow energy storage system is advantageous in that the sizes of
(Continued)

slurry storage tanks connected to an electrode cell are adjusted, thus determining the required specification of energy density.

11 Claims, 9 Drawing Sheets

(51) Int. Cl.
    *H01G 11/68*     (2013.01)
    *H01G 11/12*     (2013.01)
    *H01G 11/62*     (2013.01)
    *H01G 11/52*     (2013.01)
    *H01M 10/04*     (2006.01)

(52) U.S. Cl.
    CPC .......... *H02J 7/0022* (2013.01); *H02J 7/0052* (2013.01); *H01G 11/52* (2013.01); *H01M 10/049* (2013.01); *Y02E 10/766* (2013.01); *Y02E 60/13* (2013.01)

(58) Field of Classification Search
    USPC ........................................................ 361/502
    See application file for complete search history.

(56) References Cited

U.S. PATENT DOCUMENTS

| | | | |
|---|---|---|---|
| 2013/0154364 A1* | 6/2013 | Hennessy | H01M 8/04955 307/18 |
| 2013/0335885 A1* | 12/2013 | Ginatulin | H01G 11/36 361/511 |
| 2014/0042989 A1* | 2/2014 | Gogotsi | H01G 11/32 320/167 |

FOREIGN PATENT DOCUMENTS

| | | |
|---|---|---|
| KR | 10-2010-0100482 A | 9/2010 |
| KR | 1020120028302 A | 3/2012 |

OTHER PUBLICATIONS

Notice of Allowance issued for corresponding Korean Patent Application No. 10-2013-015303, dated May 6, 2015.

* cited by examiner

STACK-TYPE FLOW ENERGY STORAGE SYSTEM AND METHOD OF CHARGING AND DISCHARGING ENERGY USING THE SAME

CROSS-REFERENCE TO RELATED APPLICATION(S)

This application claims priority to Korean Patent Application No. 10-2013-0159303, filed on Dec. 19, 2013, the disclosure of which is incorporated by reference in its entirety.

BACKGROUND OF THE INVENTION

1. Technical Field

The present invention relates to a stack-type flow energy storage system. More particularly, the present invention relates to a stack-type flow energy storage system which can remarkably improve stability, output and energy density by using a stack-type electrode cell composed of externally-supplied slurry for an electrode and a slurry storage tank connected with the stack-type electrode cell.

2. Description of the Related Art

Recently, fossil energy policies have been issued and enforced in order to cope with the rapid increase in oil prices and the requirement for environmentally friendly energy production. In accordance with such energy policies, environmentally friendly automobiles, smart grids, and the like have attracted considerable attention, and simultaneously the necessity for the development of energy storage devices has been on the rise. Currently, a lithium secondary battery is generally used as an energy storage device, but it has problems of insufficient output characteristics, a short lifetime and the like. Accordingly, as an alternative to a secondary battery, a super capacitor is attracting considerable attention.

A super capacitor, which is an energy storage device having characteristics of both an electrolytic condenser and a secondary battery, is characterized by rapid charging and discharging, high efficiency and a semipermanent lifetime. A super capacitor has a research and development history shorter than that of a condenser or a secondary battery, but has very rapidly advanced due to the development of a novel electrode material such as active carbon, metal oxide or conductive polymer.

In the 1980's, an active carbon material was commercially used for memory backup of various electronic devices, and has lately been highlighted as a next-generation energy storage device with the advancement of an electrode material and a preparation technology.

However, as before, a conventional super capacitor has a problem of low energy density. Therefore, in order to use a super capacitor as a next-generation energy storage device, it is required to develop a large-capacity flow capacitor having high energy density.

Korean Patent Application Publication No. 10-2010-0100482 discloses a super capacitor and a preparation method thereof, which relate to a technology for maximizing stability by using a solid electrolyte and forming a polymer protector, and which are different from problems to be solved by the invention and solving means thereof.

[Prior art document] Korean Patent Application Publication No. 10-2010-0100482

SUMMARY OF THE INVENTION

Accordingly, the present invention has been devised to solve the above-mentioned problems, and the present invention intends to provide a stack-type flow energy storage system which can remarkably improve stability, output and energy density by using a stack-type electrode cell composed of externally-supplied slurry for an electrode and a slurry storage tank connected with the stack-type electrode cell.

Further, the present invention intends to provide a method of charging and discharging energy using the stack-type flow energy storage system.

Further, the present invention intends to provide an energy storage system for mobile appliances, an energy storage system for black boxes, an energy storage system for hybrid vehicles, an energy storage system for solar power generation and an energy storage system for wind power generation, each using the stack-type flow energy storage system.

In order to accomplish the above objects, an aspect of the present invention provides a stack-type flow energy storage system, including: an electrode cell including a cathode current collector, a cathode, an anode, an anode current collector and a separation membrane for separating the cathode and the anode; first slurry storage tanks for storing slurry for an electrode; and second slurry storage tanks for storing slurry for an electrode, wherein two or more unit cells, each sequentially consisting of the cathode, the separation membrane and the anode, are connected in parallel or in series to each other, and are provided between the cathode current collector and the anode current collector to form a stack cell, each of the cathode and the anode is composed of slurry for an electrode, the slurry being prepared by mixing an electrode material for a super capacitor with an electrolyte, the first slurry storage tanks are respectively connected to the cathode and the anode to store the discharged slurry, and the second slurry storage tanks are respectively connected to the cathode and the anode to store the charged slurry.

Each of the cathode current collector and the anode current collector may be made of at least one selected from the group consisting of aluminum, titanium, tantalum, nickel, stainless steel, conductive carbon and a conductive polymer.

The conductive carbon may include at least one selected from the group consisting of artificial graphite, carbon fiber, carbon black, carbon nanotube, active carbon, and graphene.

The conductive polymer may include at least one selected from the group consisting of polyaniline, polypyrrole, polythiophene, polyphenylenevinylene, polyphenylene sulfide and polyparaphenylene.

The metal may be formed into metal foil or metal foam.

The conductive carbon may be formed into a plate (for example, graphite), paper, film, foam or the like.

The conductive polymer may be formed into a plate, paper, film, foam or the like.

The separation membrane, which is a porous membrane, may be made of porous polypropylene, porous polyethylene or porous polyvinylidene fluoride (PVDF). The separation membrane may be an ion-conductive separation membrane coated with an ion-conductive material for improving ion conductivity or may be a separation membrane coated with ceramic. Further, the separation membrane may include a support.

The support may be a hard reticular structure made of polypropylene (PP) or polyethylene (PE).

The stack-type flow energy storage system may further include gaskets. In this case, the unit cell may be formed in order of gasket-cathode-separation membrane-anode-gasket.

The gasket may be made of polypropylene (PP), but is not limited thereto. The gasket may be made of all materials commonly used in the related technical field.

The electrode material for a super capacitor and the electrolyte and may be mixed at a weight ratio of 1:1~1:20. In this case, the viscosity of a fluidic electrode is appropriately maintained, and simultaneously the amount of an active material (electrode material) is suitably adjusted, thus manufacturing a fluidic electrode exhibiting high-energy and high-power characteristics.

However, the mixing ratio of the electrode material and the electrolyte may be varied according to the structure and state thereof.

The electrode material for a super capacitor may include at least one selected from the group consisting of active carbon, nanostructured active carbon, graphene, porous carbon, metal oxides, nitrides, sulfides, and conductive polymers.

The metal oxide may include at least one selected from the group consisting of rhodium (Rh)-series metals and copper (Cu)-series metals.

The nitride may include at least one selected from the group including nitrogen (N).

The sulfide may include at least one selected from the group including sulfur (S).

The conductive polymer may include at least one selected from the group consisting of polyaniline, polypyrrole, polythiophene, polyphenylenevinylene, polyphenylene sulfide and polyparaphenylene.

The electrolyte may be any one of a water-soluble electrolyte, an organic electrolyte and an ionic liquid electrolyte.

The water-soluble electrolyte may include at least one selected from the group consisting of KOH, $Na_2SO_4$, $H_2SO_4$, $H_2PO_4$ and KCl.

The organic electrolyte may be propylene carbonate (PC) or a mixture of tetraethylammonium tetrafluoroborate ($TEABF_4$) and acetonitrile (ACN). Here, the tetraethylammonium tetrafluoroborate ($TEABF_4$) and acetonitrile (ACN) may be mixed at a molar ratio ($TEABF_4$/ACN) of 0.5M~1.5M:1M.

The ionic liquid electrolyte may include at least one selected from the group consisting of 1-ethyl-3-methylimidazolium tetrafluoroborate ($EMI-BF_4$), 1-n-butyl-3-methylimidazolium tetrafluoroborate ($BMI-BF_4$), 1-ethyl-3-methylimidazolium bis-(trifluoromethylsulfonyl)imide (EMI-TFSI), 1-n-butyl-3-methylimidazolium hexafluorophosphate ($BMI-PF_6$), 1-butyl-1-methylpyrrolidinium bis(trifluoromethanesulfonyl)imide ($PYR_{14}TFSI$), N-methoxyethyl-N-methylpyrrolidinium bis-(trifluoromethanesulfonyl)imide (PYR1(201)TFSI), 1-ethyl-3-methylimidazolium trifluoromethanesulfonate (EMI-TMS), 1-butyl-1-methylpyrrolidinium bis(trifluoromethylsulfonyl)imide (BMP-BTI), 1-hexyl-3-methylimidazolium hexafluorophosphate (HMI-HFP), 1-ethyl-3-methylimidazolium dicyanamide (EMI-DCA), 11-methyl-3-octylimidazolium tetrafluoroborate (MOI-TFB), N-Methyl-N-propylpiperidinium bis (fluorosulfonyl)imide (PIP13FSI), and N-butyl-N-methylpyrrolidinium bis(fluorosulfonyl)imide) (PYR14FSI).

The ionic liquid electrolyte may be mixed with acetonitrile and then used. In this case, the ionic liquid electrolyte and acetonitrile (ACN) may be mixed at a molar ratio (ionic liquid electrolyte/ACN) of 0.5M~1.5M:1M.

Another aspect of the present invention provides a method of charging energy using the stack-type flow energy storage system, including the steps of: a) supplying slurry for an electrode into first slurry storage tanks; b) transferring the slurry from the first slurry storage tanks to a cathode and anode of an electrode cell to fill the cathode and the anode with the slurry; and c) applying electric current to the electrode cell to charge the electrode cell.

The method of charging energy may further include the step of transferring the charged slurry from the electrode cell to second slurry storage tanks and repeatedly performing the steps b) and c) using the slurry remaining in the first slurry storage tanks.

Still another aspect of the present invention provides a method of discharging energy using the stack-type flow energy storage system, including the steps of: transferring slurry stored in second slurry storage tanks to fill a cathode and an anode of an electrode cell with the slurry; and applying a load to the electrode cell.

Still another aspect of the present invention provides an energy storage system for mobile appliances using the stack-type flow energy storage system.

Still another aspect of the present invention provides an energy storage system for black boxes using the stack-type flow energy storage system.

Still another aspect of the present invention provides an energy storage system for hybrid vehicles using the stack-type flow energy storage system.

Still another aspect of the present invention provides an energy storage system for solar power generation using the stack-type flow energy storage system.

Still another aspect of the present invention provides an energy storage system for wind power generation using the stack-type flow energy storage system.

According to the present invention, since electric power can be stably supplied by the energy storage system, the problem of power quality degradation, caused by a conventional energy storage system, can be solved when a great power is generated for a short period of time.

BRIEF DESCRIPTION OF THE DRAWINGS

The above and other objects, features and advantages of the present invention will be more clearly understood from the following detailed description taken in conjunction with the accompanying drawings, in which.

REFERENCE NUMERALS

Figure 1:
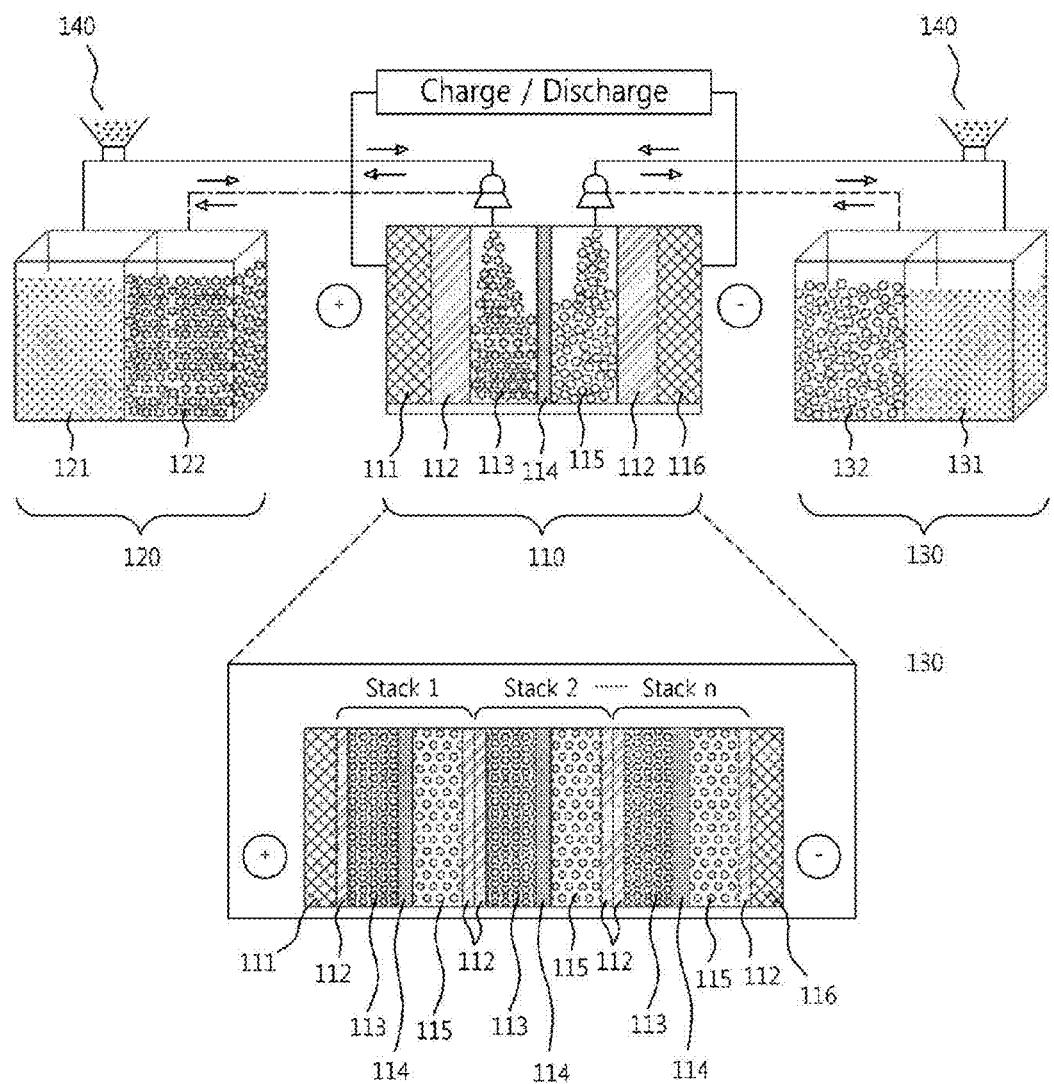
FIG. 1 is a schematic view showing a stack-type flow energy storage system according to an embodiment of the present invention.

100: stack-type flow energy storage system
110: stack cell
111: cathode current collector 112: gasket
113: cathode
114: separation membrane
115: anode
116: anode current collector
117: frame
120, 130: slurry storage tank
121, 131: first tank for storing slurry for electrode
122, 132: second tank for storing slurry for electrode
140: slurry flow

DESCRIPTION OF THE PREFERRED EMBODIMENTS

Hereinafter, preferred embodiments of the present invention will be described in detail with reference to the attached drawings. The present invention may be embodied in many different forms without departing from the spirit and significant characteristics of the invention. Therefore, the embodiments of the present invention are disclosed only for illustrative purposes and should not be construed as limiting the present invention.

Hereinafter, a stack-type flow energy storage system according to an embodiment of the present invention will be described in detail with reference to FIG. 1. FIG. 1 is a schematic view showing a stack-type flow energy storage system according to an embodiment of the present invention.

The stack-type flow energy storage system 100 according to an embodiment of the present invention is configured such that, unlike a conventional electrode cell in which the amounts of an electrode material and an electrolyte are predetermined, slurry for an electrode, prepared by mixing an electrode material with an electrolyte, is stored in slurry storage tanks connected to an electrode cell, and the slurry is introduced into the electrode cell therefrom. Discharged slurry is stored in first slurry storage tanks 121 and 131, and charged slurry is stored in second slurry storage tanks 122 and 132. The flow energy storage system 100 has an advantage of increasing output power because it includes a stack-type electrode cell in which unit cells, each sequentially consisting of a cathode 113, a separation membrane 114 and an anode 115, are connected in parallel or in series to each other. Further, the flow energy storage system 100 has an advantage of setting the required specification of energy density by adjusting the sizes of the slurry storage tanks for storing slurry for an electrode.

A method of charging energy using the stack-type flow energy storage system according to an embodiment of the present invention is described as follows.

The discharged slurry stored in the first slurry storage tanks 121 and 131 is transferred to the cathode 113 and the anode 115 of the electrode cell by pumping to fill the cathode 113 and the anode 115 with the slurry, and then electric current is applied to the electrode cell to start the charging of the electrode cell. The charged slurry is transferred to the second slurry storage tanks 122 and 132 connected to the electrode cell to be stored therein. These steps are repeated to charge all the slurry stored in the first slurry storage tanks 121 and 131.

A method of discharging energy using the stack-type flow energy storage system according to an embodiment of the present invention is described as follows.

The charged slurry stored in the second slurry storage tanks 122 and 132 is transferred to the cathode 113 and the anode 115 of the electrode cell by pumping to fill the cathode 113 and the anode 115 with the slurry, and then a load is applied to the electrode cell to start the discharging of the electrode cell. These steps are repeated to discharge all the slurry stored in the second slurry storage tanks 122 and 132.

Example 1: Manufacture of Stack-Type Electrode Cell (Stack Cell)

Figure 2:
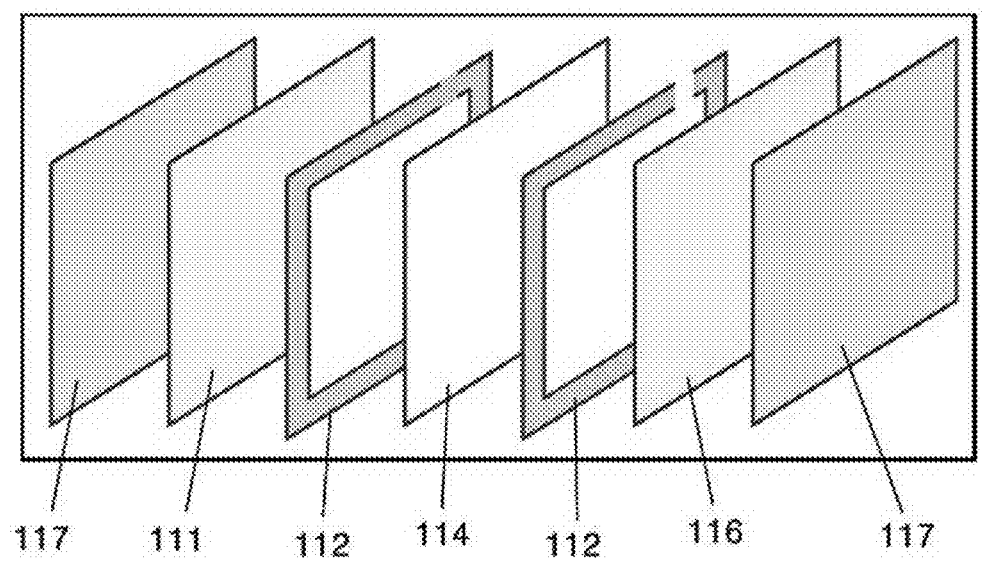
FIG. 2 is a schematic view showing a unit electrode cell (unit cell) of Example 1.
Figure 3:
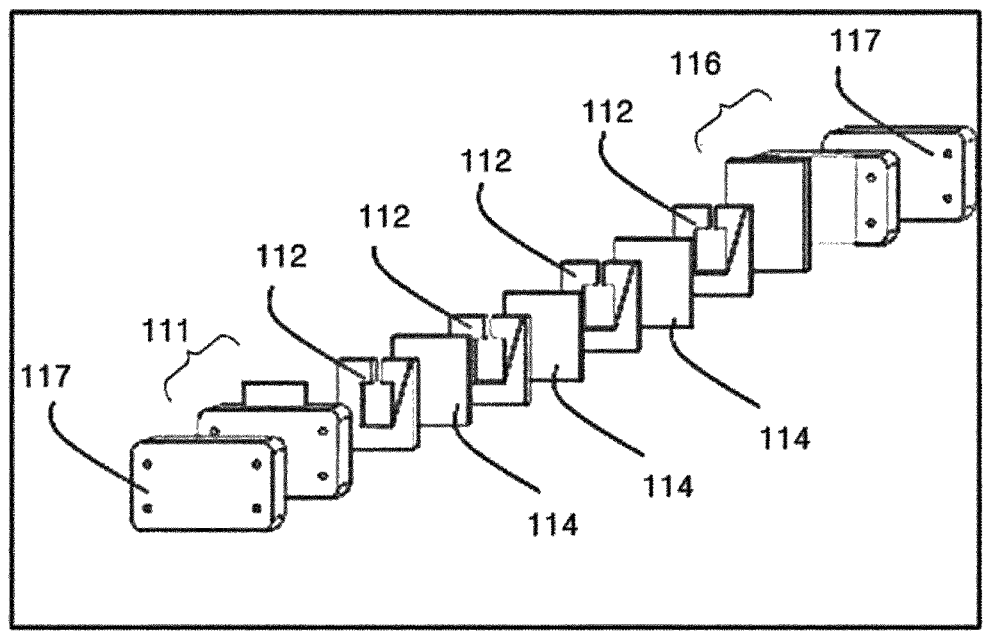
FIG. 3 is a schematic view showing a stack-type electrode cell (stack cell) of Example 1.
Figure 4:
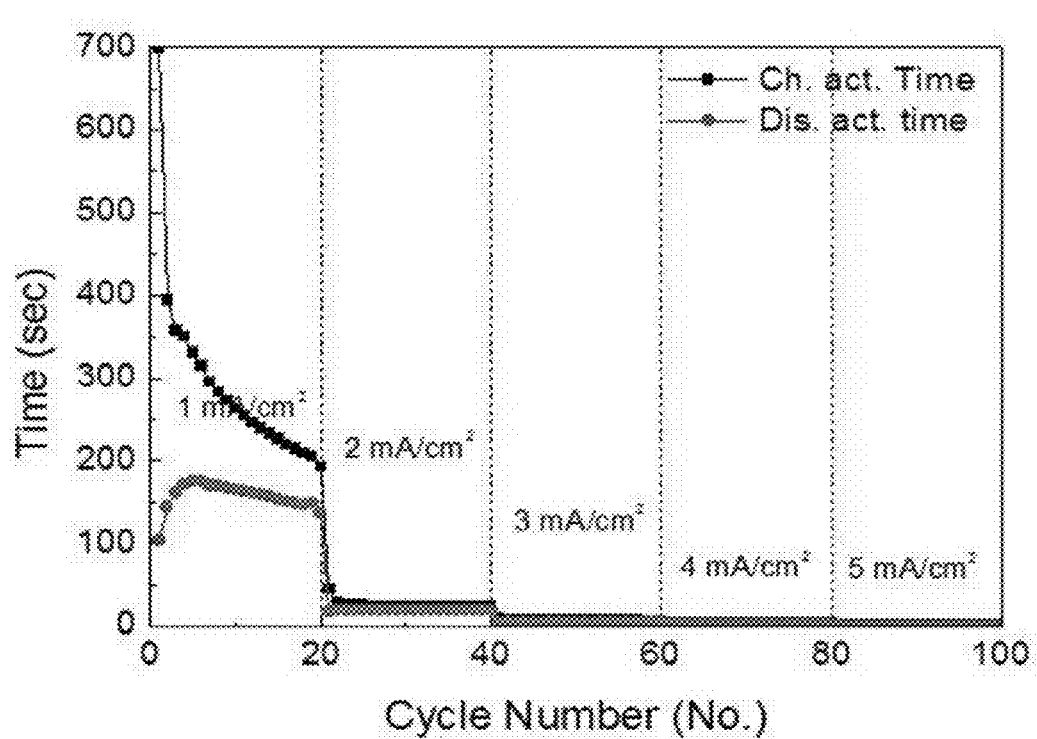
FIG. 4 is a graph showing the current density-charging and discharging time characteristics of the stack cell of Example 1.

As shown in FIG. 2, high-capacity unit electrode cells were fabricated, and, as shown in FIG. 3, three unit cells were laminated to manufacture a stack-type electrode cell (stack cell) (electrode position: referring to FIG. 1). Each frame had an electrode area of 17 cm×18 cm and a thickness of 3 mm. Active carbon (MSP-20) was used as an electrode material, and a mixture (1.5 M TEABF$_4$/ACN) of tetraethylammonium tetrafluoroborate (TEABF$_4$) and acetonitrile (ACN) was used as an electrolyte. The active carbon and electrolyte were mixed at a weight ratio of 1:5, and then total 180 mL of slurry was filled in a cathode and an anode by 90 mL, respectively, and then sealed by a gasket made of polypropylene (PP). A separation membrane made of PP was used as the separation membrane for separating the cathode and the anode.

Comparative Example 1: Manufacture of Unit Electrode Cell (Unit Cell)

For the comparison with the stack cell of Example 1, as shown in FIG. 2, high-capacity unit electrode cells were fabricated, and one unit cell was made into a single electrode cell (electrode position: referring to FIG. 1). Each frame had an electrode area of 16 cm×17 cm and a thickness of 1.2 mm. Active carbon (MSP-20) was used as an electrode material, and a mixture (1.5 M TEABF$_4$/ACN) of tetraethylammonium tetrafluoroborate (TEABF$_4$) and acetonitrile (ACN) was used as an electrolyte. The active carbon and electrolyte were mixed at a weight ratio of 1:5, and then total 48 mL of slurry was charged in a cathode and an anode by 24 mL, respectively, and then sealed by a gasket made of polypropylene (PP). A separation membrane made of PP was used as the separation membrane for separating the cathode and the anode.

Test Example 1: Analysis of Charge-Discharge Characteristics of Electrode Cell Analysis of Charge-Discharge Characteristics of Stack-Type Electrode Cell (Example 1)

Figure 5:
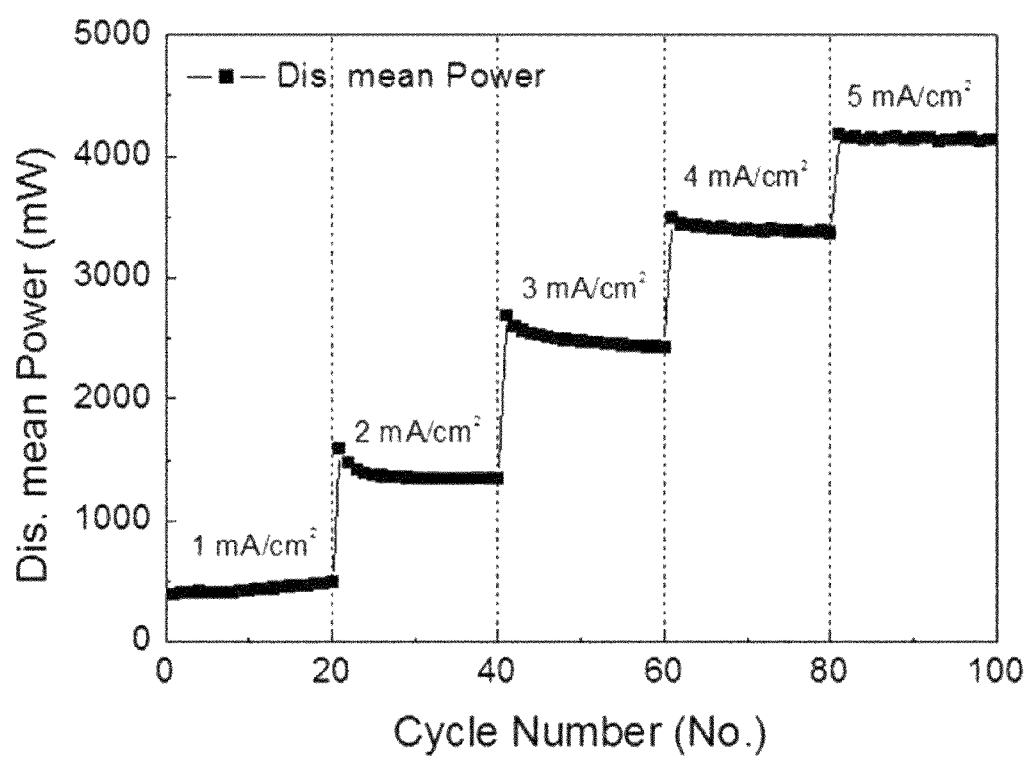
FIG. 5 is a graph showing the current density-mean power characteristics of the stack cell of Example 1.
Figure 6:
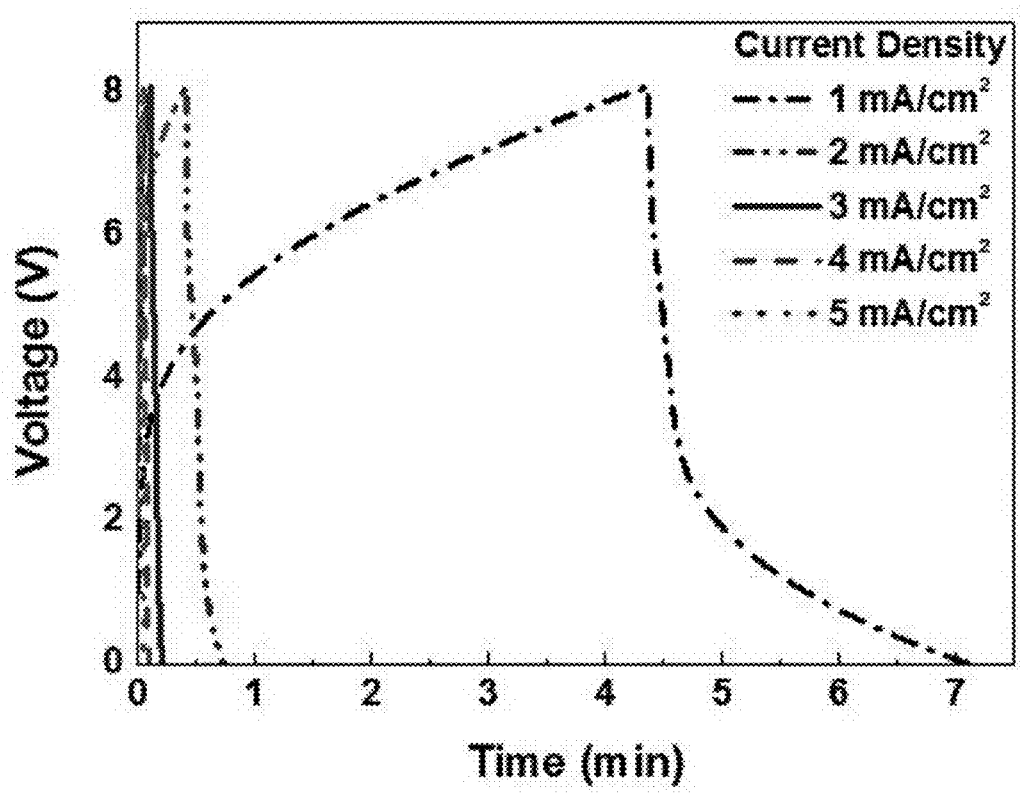
FIGS. 6 and 7 are graphs each showing the voltage-time characteristics of the stack cell of Example 1.
Figure 7:
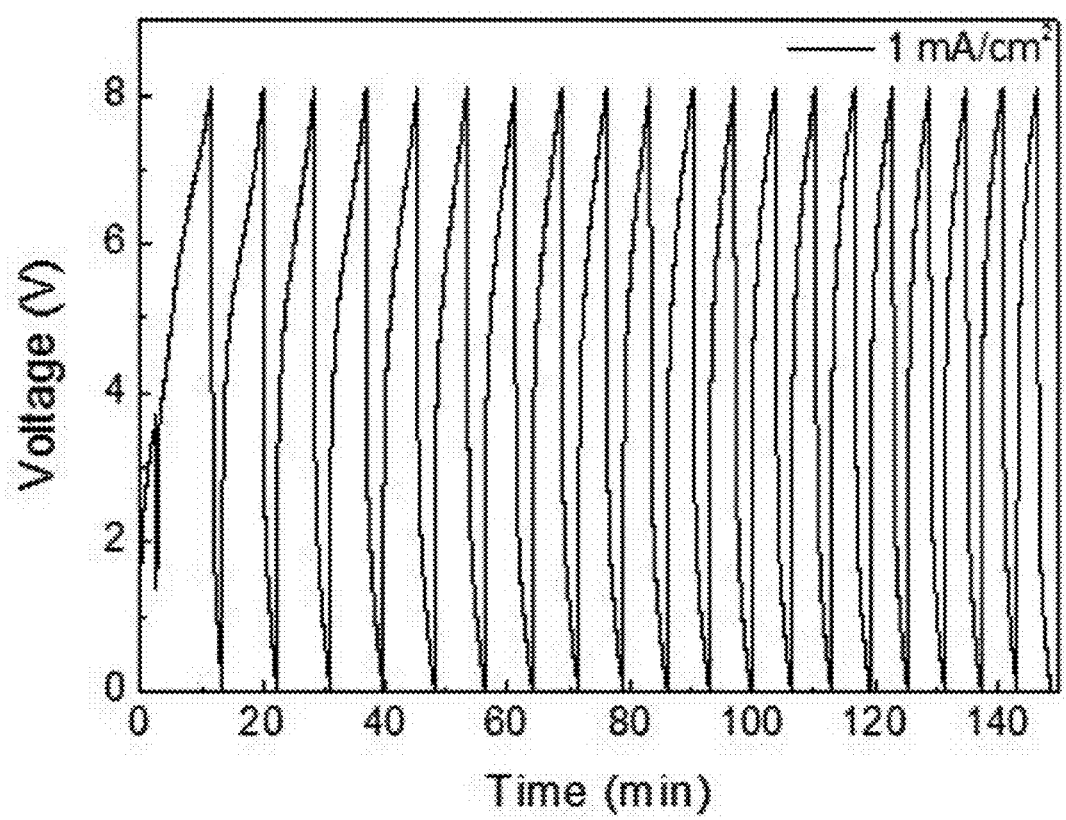

The charge-discharge capacities of the electrode cell manufactured in Example 1 (stack cell in which three unit cells are connected in series to each other) were measured under the conditions of current density of 1 mA/cm$^2$, 2 mA/cm$^2$, 3 mA/cm$^2$, 4 mA/cm$^2$, 5 mA/cm$^2$, and the charge-discharge characteristics thereof were evaluated with respect to each 20 cycle according to each current density, and the results thereof are shown in FIGS. 4 to 7 (voltage range: 0 V~8 V). From the results thereof, it can be seen that discharge time was maintained at about 180 seconds in a voltage range of 0 V~8 V when current density was 1 mA/cm$^2$, and charging-discharging was performed even at a current density of 5 mA/cm$^2$. Referring to HG. 4, it can be ascertained that discharge time decreases as current density increases. Referring to FIG. 5, it can be ascertained that average output power increases with the increase of current density. FIG. 6 shows a voltage profile according to the change of current density. From FIG. 6, it can be ascertained that this voltage profile is different from that (linear voltage profile at the time of charging-discharging) of a conventional cell-type super capacity, and that this voltage profile exists in the form of a curved voltage profile due to the fluidity characteristics of slurry. Referring to FIGS. 6 and 7, it can be ascertained that, in the case of a current density of 1 mA/cm$^2$, charge time was about 4 min, discharge time was 3 min, and charging-discharging was stably performed for about 140 min. Consequently, from the test results, it can be ascertained that charging-discharging can be performed even in the case of a high-capacity stack cell (wherein, three unit cells are connected in series to each other), and that the possibility of a high-capacity flow energy storage system using the stack cell exists.

Analysis of Charge-Discharge Characteristics of Unit Electrode Cell (Comparative Example 1)

Figure 8:
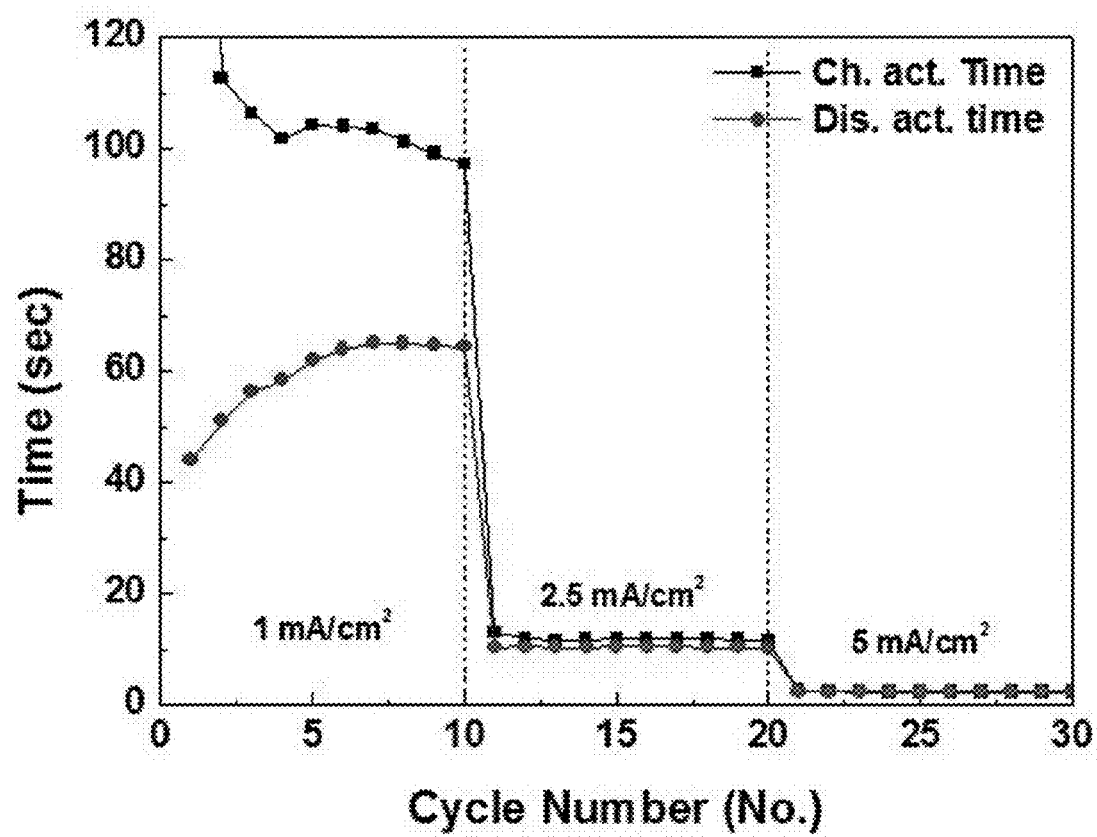
FIG. 8 is a graph showing the current density-charging and discharging time characteristics of the unit cell of Comparative Example 1.
Figure 9:
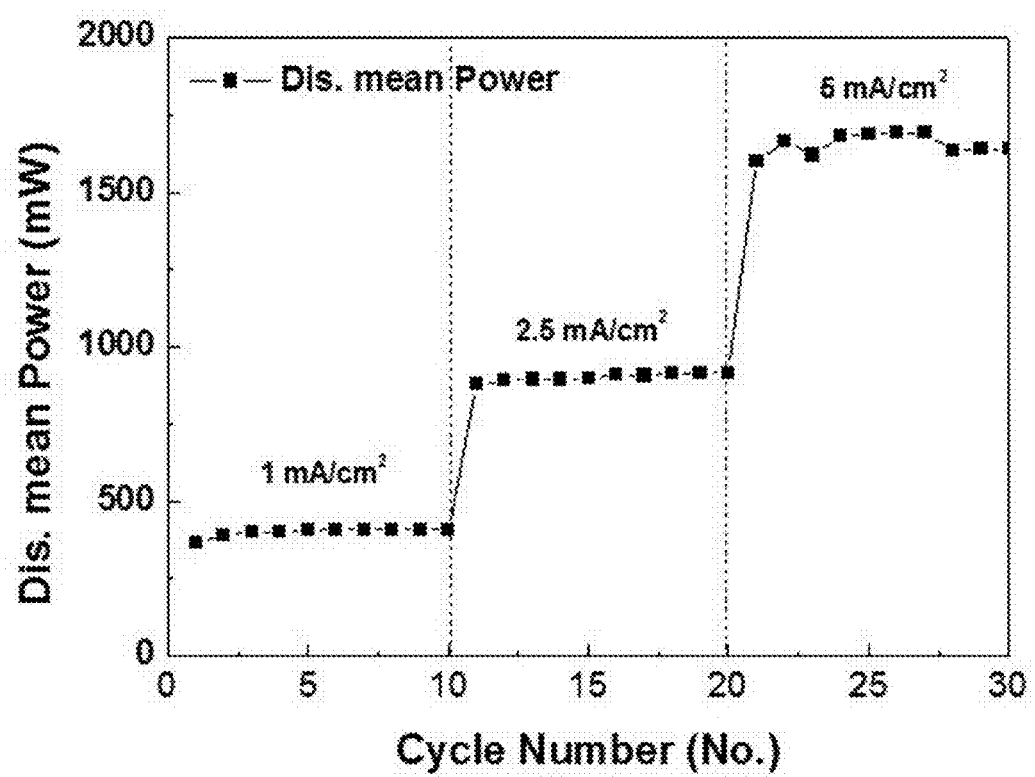
FIG. 9 is a graph showing the current density-mean power characteristics of the unit cell of Comparative Example 1.

For the comparison with the stack cell manufactured in Example 1, the charge-discharge capacities of the electrode cell manufactured in Comparative Example 1 (one unit cell) were measured under the conditions of current density of 1 mA/cm$^2$, 2.5 mA/cm$^2$ and 5 mA/cm$^2$, and the charge-discharge characteristics thereof were evaluated with respect to each 10 cycles according to each current density, and the results thereof are shown in FIGS. 8 and 9 (voltage range: 0 V~2.7 V). From the results thereof, it can be seen that discharge time was maintained at about 60 seconds in a voltage range of 0 V~2.7 V when current density was 1 mA/cm$^2$. As shown in FIG. 9, it can be seen that average output power increases with the increase of current density, and that the output power of the electrode cell of Comparative Example 1 is lower than that of the stack cell of Example 1.

As described above, according to the present invention, unit cells, each consisting of a cathode, a separation membrane and an anode, are connected in parallel or in series to each other to make a stack cell, thus remarkably increasing output power.

Further, the sizes of slurry storage tanks connected to an electrode cell are adjusted, thus determining the required specification of energy density.

Further, optimal channels are realized by current collectors and gaskets, and the concentration of an electrode material including an electrolyte is adjusted to form desirable slurry electrode, thus lowering the resistance of a stack cell.

Further, mechanical strength is increased by applying a support to a separation membrane, thus preventing a sagging phenomenon that can be caused by a fluidic electrode material.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stack-type flow energy storage system, comprising:
an electrode cell including a cathode current collector, a cathode, an anode, an anode current collector and a separation membrane for separating the cathode and the anode;
first slurry storage tanks for storing slurry for an electrode; and
second slurry storage tanks for storing slurry for an electrode,
wherein two or more unit cells, each sequentially consisting of the cathode, the separation membrane and the anode, are connected in parallel or in series to each other, and are provided between the cathode current collector and the anode current collector to form a stack cell,
each of the cathode and the anode is composed of slurry for an electrode, the slurry being prepared by mixing an electrode material for a super capacitor with an electrolyte,
the first slurry storage tanks are respectively connected to the cathode and the anode to store the discharged slurry, and
the second slurry storage tanks are respectively connected to the cathode and the anode to store the charged slurry;
wherein the separation membrane is a porous membrane, is made of porous polypropylene, porous polyethylene or porous polyvinylidene fluoride, and includes a support;
wherein each unit cell further comprises gaskets for sealing the cathode and the anode composed of the slurry for an electrode such that each unit cell is formed in an order of gasket-cathode-separation membrane-anode-gasket and wherein each gasket includes at least one opening in a perimeter thereof; and
wherein the electrode material for a super capacitor and the electrolyte are mixed at a weight ratio of 1:1~1:20 to lower the resistance of the stack-type flow energy storage system.

2. The stack-type flow energy storage system of claim 1, wherein each of the cathode current collector and the anode current collector is made of at least one selected from the group consisting of aluminum, titanium, tantalum, nickel, stainless steel, conductive carbon and a conductive polymer.

3. The stack-type flow energy storage system of claim 1, wherein the support is a reticular structure made of at least one selected form the group consisting of polypropylene and polyethylene.

4. The stack-type flow energy storage system of claim 1, wherein the electrode material for a super capacitor includes at least one selected from the group consisting of active carbon, nanostructured active carbon, graphene, porous carbon, metal oxides, nitrides, sulfides, and conductive polymers.

5. The stack-type flow energy storage system of claim 1, wherein the electrolyte is any one selected from the group consisting of a water-soluble electrolyte, an organic electrolyte and an ionic liquid electrolyte.

6. The stack-type flow energy storage system of claim 5, wherein the water-soluble electrolyte includes at least one selected from the group consisting of KOH, $Na_2SO_4$, $H_2SO_4$, $H_2PO_4$ and KCl,
the organic electrolyte includes at least one selected from the group consisting of propylene carbonate and a mixture of tetraethylammonium tetrafluoroborate and acetonitrile, and
the ionic liquid electrolyte include at least one selected from the group consisting of 1-ethyl-3-methylimidazolium tetrafluoroborate, 1-n-butyl-3-methylimidazolium tetrafluoroborate, 1-ethyl-3-methylimidazolium bis-(trifluoromethylsulfonyl)imide, 1-n-butyl-3-methylimidazolium hexafluorophosphate, 1-butyl-1-methylpyrrolidinium bis(trifluoromethanesulfonyl)imide, N-methoxyethyl-N-methylpyrrolidinium bis-(trifluoromethanesulfonyl)imide, 1-ethyl-3-methylimidazolium trifluoromethanesulfonate, 1-butyl-1-methylpyrrolidinium bis(trifluoromethylsulfonyl)imide, 1-hexyl- 3-methylimidazolium hexafluorophosphate, 1-ethyl-3-methylimidazolium dicyanamide, 11-methyl-3-octylimidazolium tetrafluoroborate, N-Methyl-N-propylpiperidinium bis(fluorosulfonyl)imide, and N-butyl-N-methylpyrrolidinium bis(fluorosulfonyl)imide.

7. The stack-type flow energy storage system of claim 6, wherein, in the organic electrolyte, tetraethylammonium tetrafluoroborate and acetonitrile are mixed at a molar ratio of 0.5M~1.5M:1M.

8. A method of charging and discharging energy using the stack-type flow energy storage system of claim 1, comprising the steps of:
   a) supplying slurry for an electrode into first slurry storage tanks;
   b) transferring the slurry from the first slurry storage tanks to a cathode and anode of an electrode cell to fill the cathode and the anode with the slurry; and
   c) applying electric current to the electrode cell to charge the electrode cell.

9. The method of claim 8, further comprising the step of transferring the charged slurry from the electrode cell to second slurry storage tanks and repeatedly performing the steps b) and c) using the slurry remaining in the first slurry storage tanks.

10. The method of claim 9, further comprising the steps of:
   transferring the slurry stored in the second slurry storage tanks to fill the cathode and the anode of the electrode cell with the slurry; and
   applying a load to the electrode cell.

11. The stack-type flow energy storage system of claim 1, wherein the stack-type flow energy storage system is used as any one selected from among an energy storage system for mobile appliances, an energy storage system for black boxes, an energy storage system for hybrid vehicles, an energy storage system for solar power generation and an energy storage system for wind power generation.

\* \* \* \* \*